United States Patent Office 3,594,473
Patented July 20, 1971

3,594,473
ANTI-HAEMORRHOIDALLY ACTIVE PREPARATIONS AND THE USE OF A D-GLUCOFURANOSIDE IN SUCH PREPARATIONS
Alfred Hunger and Anne-Marie Ory, Basel, and Max Schrenzel, Munchenstein, Switzerland, assignors to Ciba Corporation, Summit, N.J.
No Drawing. Filed July 8, 1969, Ser. No. 840,023
Claims priority, application Switzerland, July 19, 1968, 10,817/68
Int. Cl. A61j 3/04, 9/02, 9/06
U.S. Cl. 424—180
20 Claims

ABSTRACT OF THE DISCLOSURE

The invention provides anti-haemorrhoidally active preparations for rectal or local administration containing ethyl-3,5,6-tri-O-benzyl-D-glucofuranoside.

The present invention provides antihaemorrhoidally active preparations for rectal or local administration, especially creams, ointments and suppositories containing ethyl-3,5,6-tri-O-benzyl-D-glucofuranoside, as well as their application and manufacture.

It is known that ethyl-3,5,6-tri-O-benzyl - D - glucofuranoside, marketed under the registered trade name Glyvenol, has various pharmacological effects that can be utilized in controlling the pathology involved in venous circulation trouble. When administered parenterally or especially orally, it displays specific activities in that it seals off vessels or reduces the capillary permeability and has distinct inhibiting properties for oedemas and inflammations. This substance further antagonizes a variety of endogenic substances that are of importance as mediators in inflamed conditions and in the incidence of pain. Furthermore, it has anti-allergic and antianaphylactic properties because it supports the defensive function. It was surprising to observe that this drug, which was recommended for parenteral or especially oral administration for the treatment of venous circulation trouble, of the varicose syndrome and as adjuvant in cases of phlebitis and periphlebitis, can be used with good effects as a rectally or locally applied medicament for the treatment of haemorrhoids.

Accordingly, the present invention relates to the use of ethyl-3,5,6-tri-O-benzyl-D-glucofuranoside as a locally applied means for treating haemorrhoids, preferably in form of ointments or creams or in form of suppositories. The creams, that is to say oil-water emulsions, are preferred over the ointments.

The new preparations contain the anti-haemorrhoidal substance in the usual concentration; for ointments and creams a concentration from 1 to 10%, especially 5%, and for suppositories (having, for example, the usual weight of 2 g.) a concentration from 5 to 30%, especially 15–25% and in the first place of 20% is suitable.

In addition to the said active substance the preparations may contain a local anaesthetic in a concentration from 0.1 to 5%, such as lidocain, piperocain, thesite, 2-(m-butoxyphenoxy)-diethylamine or especially dibucain. The latter is preferably used in a concentration from 0.1 to 3%, in the first place from 0.25 to 0.5%.

The new preparations are formulated by conventional methods used in the manufacture of ointments, creams or suppositories respectively, with the use of assistants that do not react with the active substances. Thus, for the manufacture of ointments and creams there are preferably used white petroleum jelly, higher aliphatic alcohols, sorbitan esters and their polyalkylene derivatives, polyalkyleneglycols, higher hydrocarbons, vegetable oils, glycerol and isopropyl esters of medium fatty acids. Suppositories are preferably manufactured with cocoa butter, wax, mixtures of mono-, di- and triglycerides of fatty acids containing 12 to 18 carbon atoms, mixtures of saturated fatty acids with 10 to 18 carbon atoms, natural and synthetic fats such as cottonseed oil, palm kernel stearin hydrogenated peanut oil, pork fat, wool fat, coconut fat, aliphatic alcohols, condensation products of polyethylene oxide with fatty acid glycerides or sorbitans, phthalic acid esters with aliphatic alcohols, especially cetyl alcohols.

If desired, further assistants, such as preservatives, colouring matter or perfume may be incorporated with the preparations. They may also contain further therapeutically active substances, such as antibiotics, antimycotics or antiseptics.

The invention is also concerned with the manufacture of the new preparations, characterized in that the active substances together with the excipients and, if desired, further assistants and/or active substances are made up in known manner in the desired form of application.

The following non-limiting examples illustrate the invention.

EXAMPLE 1

Suppositories

| | Mg. |
|---|---|
| Ethyl-3,5,6-tri-O-benzyl-D-glucofuranoside | 400 |

Adeps solidus (mixture of mono-, di- and triglycerides of higher fatty acids) up to 2000 mg.

EXAMPLE 2

Suppositories

| | Mg. |
|---|---|
| Ethyl-3,5,6-tri-O-benzyl-D-glucofuranoside | 400 |
| Wax | 100 |

Cocoa butter, to make 2000 mg.

The suppositories described in Examples 1 and 2 can be manufactured by mixing the active substance with the melted assistants, pouring the melt into suppository moulds and allowing them to cool.

EXAMPLE 3

Suppositories

| | Mg. |
|---|---|
| Ethyl-3,5,6-tri-O-benzyl-D-glucofuranoside | 400 |
| Dibucain | 5 |

Adeps solidus, to make 2000 mg.

EXAMPLE 4

Suppositories

| | Mg. |
|---|---|
| Ethyl-3,5,6-tri-O-benzyl-D-glucofuranoside | 400 |
| Dibucain | 5 |
| Wax | 100 |

Cocoa butter, to make 2000 mg.

The suppositories of the compositions shown in Examples 3 and 4 are prepared by dissolving dibucain in the active substance, mixing this solution with the melted assistants, pouring the mixture into suitable suppository moulds and cooling.

EXAMPLE 5

Creams of the following composition:

| | Grams |
|---|---|
| Ethyl-3,5,6-tri-O-benzyl-D-glucofuranoside | 5.0 |
| Arlacel 60 | 1.0 |
| Tween 60 | 4.0 |
| Cetyl alcohol | 3.0 |
| Stearic acid | 9.0 |
| Liquid paraffin | 12.0 |
| Sorbitol 70% | 6.0 |
| p-Hydroxybenzoic acid ester | 0.23 |

Deionized water, to make 100.0.

EXAMPLE 6

| Creams of the following composition: | Grams |
|---|---|
| Ethyl-3,5,6-tri-O-benzyl-D-glucofuranoside | 5.0 |
| Cetomacrogol | 1.0 |
| Isopropyl palmitate | 2.0 |
| Glycerol monostearate | 5.0 |
| Cetyl alcohol | 6.5 |
| Sorbitol 70% | 6.0 |
| p-Hydroxybenzoic acid ester | 0.23 |
| Deionized water, to make 100.0. | |

The creams of the compositions shown in Examples 5 and 6 are prepared by melting the fatty ingredients together, mixing in the active substance, on one hand, and, on the other hand, dissolving the preservative at 80–90° C. in water, adding the sorbitol, and mixing the two mixtures together with thorough stirring.

EXAMPLE 7

| Creams of the following composition: | Grams |
|---|---|
| Ethyl-3,5,6-tri-O-benzyl-D-glucofuranoside | 5.0 |
| Dibucain HCl | 0.25 |
| Arlacel 60 | 1.0 |
| Tween 60 | 4.0 |
| Cetyl alcohol | 3.0 |
| Stearic acid | 9.0 |
| Liquid paraffin | 12.0 |
| Sorbitol 70% | 6.0 |
| p-Hydroxybenzoic acid methyl ester | 0.23 |
| Deionized water, to make 100.0. | |

EXAMPLE 8

| Creams of the following composition: | Grams |
|---|---|
| Ethyl-3,5,6-tri-O-benzyl-D-glucofuranoside | 5.0 |
| Dibucain HCl | 0.25 |
| Arlacel 60 | 1.5 |
| Tween 60 | 6.0 |
| Liquid paraffin | 10.0 |
| Aluminiumpentasilicate | 7.5 |
| p-Hydroxybenzoic acid methyl ester | 0.23 |
| Deionized water, to make 100.0. | |

To prepare the creams of the compositions mentioned in Examples 7 and 8 the fatty matter is melted together, the ethyl-3,5,6-tri-O-benzyl-D-glucofuranoside is admixed and, on the other hand, the preservative is dissolved together with dibucain HCl in water, if desired sorbitol is admixed and the two mixtures are mixed together with thorough stirring.

What is claimed is:

1. A method which comprises the step of treating haemorrhoids with an effective amount of ethyl-3,5,6-tri-O-benzyl-D-glucofuranoside for the treatment of haemorrhoids by rectal or local administration.

2. A method which comprises the step of treating haemorrhoids with an effective amount of ethyl-3,5,6-tri-O-benzyl-D-glucofuranoside according to claim 1 jointly with a local anaesthetic.

3. A method which comprises the step of treating haemorrhoids with an effective amount of ethyl-3,5,6-tri-O-benzyl-D-glucofuranoside according to claim 1 in the form of suppositories.

4. A method which comprises the step of treating haemorrhoids with an effective amount of ethyl-3,5,6-tri-O-benzyl-D-glucofuranoside according to claim 2 in the form of suppositories.

5. A method which comprises the step of treating haemorrhoids with an effective amount of ethyl-3,5,6-tri-O-benzyl-D-glucofuranoside according to claim 2 in the form of an ointment or preferably a cream.

6. A preparation having an antihaemorrhoidal action for rectal or local administration comprising a suppository, cream or ointment vehicle containing an effective amount of ethyl-3,5,6-tri-O-benzyl-D-glucofuranoside.

7. A preparation having an antihaemorrhoidal action according to claim 6 characterized by a content of ethyl-3,5,6-tri-O-benzyl-D-glucofuranoside and a local anaesthetic.

8. A preparation having an antihaemorrhoidal action according to claim 6 in the form of a suppository.

9. A preparation having an antihaemorrhoidal action according to claim 7 in the form of a suppository.

10. A suppository having an antihaemorrhoidal action according to claim 6 characterized by a content of ethyl-3,5,6-tri-O-benzyl-D-glucofuranoside in a concentration of 5–30%.

11. A suppository having an antihaemorrhoidal action according to claim 10 characterized by a content of ethyl-3,5,6-tri-O-benzyl-D-glucofuranoside in a concentration of 15–25%.

12. A suppository having an antihaemorrhoidal action according to claim 11 characterized by a content of ethyl-3,5,6-tri-O-benzyl-D-glucofuranoside in a concentration of 20%.

13. A suppository having an antihaemorrhoidal action according to claim 7 characterized by a content of a local anaesthetic in a concentration of 0.1–5%.

14. A suppository having an antihaemorrhoidal action according to claim 13 with a content of dibucain.

15. A suppository having an antihaemorrhoidal action according to claim 14 with a content of dibucain in a concentration of 0.1–3%.

16. A suppository having an antihaemorrhoidal action according to claim 15 with a content of dibucain in a concentration of 0.25–0.5%.

17. A preparation having an antihaemorrhoidal action according to claim 7 in the form of an ointment or a cream.

18. An ointment, or a cream, having an antihaemorrhoidal action according to claim 17, with a content of ethyl-3,5,6-tri-O-benzyl-D-glucofuranoside in a concentration of 1–10% and of a local anaesthetic.

19. An ointment, or a cream, having an antihaemorrhoidal action according to claim 18, with a content of dibucain or a salt thereof in a concentration of 0.1–3%.

20. An ointment, or a cream, having an antihaemorrhoidal action according to claim 18, with a content of dibucain or a salt thereof in a concentration of 0.25–0.5%.

References Cited

UNITED STATES PATENTS

| 3,157,634 | 11/1964 | Druey et al. | 260—210 |
| 3,494,913 | 2/1970 | Rossi | 260—210 |

SHEP K. ROSE, Primary Examiner